United States Patent
Sandholm et al.

(10) Patent No.: US 8,819,698 B2
(45) Date of Patent: Aug. 26, 2014

(54) CROSS-PLATFORM WEB-BASED NATIVE DEVICE FEATURE ACCESS

(75) Inventors: Thomas E. Sandholm, Sunnyvale, CA (US); Francois-Xavier Kowalski, Lumbin (FR); David Penkler, Claix (FR)

(73) Assignee: Hewlett-Packard Development Company, L. P., Houston, TX (US)

( * ) Notice: Subject to any disclaimer, the term of this patent is extended or adjusted under 35 U.S.C. 154(b) by 211 days.

(21) Appl. No.: 13/437,703

(22) Filed: Apr. 2, 2012

(65) Prior Publication Data

US 2013/0263160 A1 Oct. 3, 2013

(51) Int. Cl.
*G06F 3/00* (2006.01)
*G05F 1/70* (2006.01)

(52) U.S. Cl.
USPC .......................................... 719/310; 323/205

(58) Field of Classification Search
CPC .................................. G06F 9/54; G06F 9/547
See application file for complete search history.

(56) References Cited

U.S. PATENT DOCUMENTS

| | | | |
|---|---|---|---|
| 6,489,980 B1 * | 12/2002 | Scott et al. ................. | 715/854 |
| 6,920,410 B2 * | 7/2005 | Southam et al. ............ | 702/122 |
| 7,877,461 B1 | 1/2011 | Rimmer | |
| 8,554,190 B2 * | 10/2013 | Smith et al. ................. | 455/418 |
| 8,595,832 B1 * | 11/2013 | Yee et al. ..................... | 726/22 |
| 2002/0107890 A1 * | 8/2002 | Gao et al. ..................... | 707/513 |
| 2004/0015889 A1 * | 1/2004 | Todd et al. ................... | 717/137 |
| 2007/0113282 A1 * | 5/2007 | Ross ............................. | 726/22 |
| 2009/0228862 A1 | 9/2009 | Bertelrud et al. | |
| 2011/0154305 A1 | 6/2011 | LeRoux et al. | |
| 2013/0191509 A1 * | 7/2013 | Loughry et al. ............. | 709/219 |

FOREIGN PATENT DOCUMENTS

KR 20110130611 A 12/2011

OTHER PUBLICATIONS

R. Bentley, Basic support for cooperative work on the World Wide Web, 1997.*
4 Steps to Creating a Mobile Strategy, appcelerator, Feb. 2011.
Android remote code loading, stackoverflow, Download Date: Apr. 2, 2012. <http://stackoverflow.com/questions/1001944/android-remote-code-loading>.
Dalu, Mauro, Mobile Apps cross-platform development challenge: PhoneGap vs. Titanium vs. Rhodes, Oh my dear Blog!, Jan. 13, 2012.<http://surgeworks.com/blog/lab-mobile/iphone/mobile-apps-cross-platform-development-challenge-phonegap-vs-titanium-vs-rhodes>.
Pepper plugin implementation, The Chromium Projects, Download Date: Feb. 2011.
Phonegap: Requirements for phonegap beginners:Getting Started with PhoneGap iOS using Xcode 4, Feb. 2011.
William Clark et at., Magic Quadrant for Mobile Consumer Application Platforms, Gartner, Inc, Research, Feb. 2011.

* cited by examiner

*Primary Examiner* — Lechi Truong

(57) ABSTRACT

A method for cross-platform web-based native device feature access may include receiving a call from a web application to access a native device feature, with the call being redirected to a platform agnostic custom URL. The method may further include translating the custom URL into a native object call, and accessing the native device feature based on the native object call.

15 Claims, 6 Drawing Sheets

```
1: String action = getIntent().getData().getQueryParameter("action");
2: String json = getIntent().getData().getQueryParameter("json");
3: Class actionClass = loadClass(PACKAGE + action);
4: Method onMethod = getMethod("onProcess");
5: Object out = onMethod.invoke(inst, toObject(json));
6: String outJson = toJson(out);
7: sendResponse(outJson);
```

Fig. 3A

```
1: - (BOOL)application:(UIApplication *)application handleOpenURL:(NSURL *)url {
2:    NSString* queryString = [url query];
3:    NSString* action = [getParameter query:queryString parameter:@"action"];
4:    NSString* json = [getParameter query:queryString parameter:@"json"];
5:    SBJsonParser *parser = [[SBJsonParser alloc] init];
6:    NSDictionary* input = (NSDictionary*)[parser objectWithString:json];
7:    NSDictionary* output;
      ...
8:    if ([action isEqualToString:@"Vibrate"]) {
9:        output = [self Vibrate: input];
      }
      ...
10:   [self SendResponse:output ];
      ...
}
```

Fig. 3B

CROSS-PLATFORM WEB-BASED NATIVE DEVICE FEATURE ACCESS

BACKGROUND

Mobile applications offer application programming interfaces (APIs) for accessing, for example, Internet services, device sensors for a device on which an application is installed, user interface (UI) components, etc. The applications can be pre-installed on mobile devices during manufacture, downloaded by customers from various mobile software distribution platforms, or include web applications delivered over Hypertext Transfer Protocol (HTTP). Due to differences in device platforms, applications are written or deployed in native application code that is specific to a particular platform. In order to realize any periodic modifications in applications, the applications also need to be updated for each modification. These aspects have been known to limit the speed of development and deployment of new applications across different platforms.

BRIEF DESCRIPTION OF DRAWINGS

Features of the present disclosure are illustrated by way of example and not limited in the following figure(s), in which like numerals indicate like elements, in which:

FIGS. 3A and 3B respectively illustrate an example of code for a runtime module for an ANDROID device, and an example of code for the runtime module for an iOS device, according to an example of the present disclosure;

DETAILED DESCRIPTION

Figure 1:
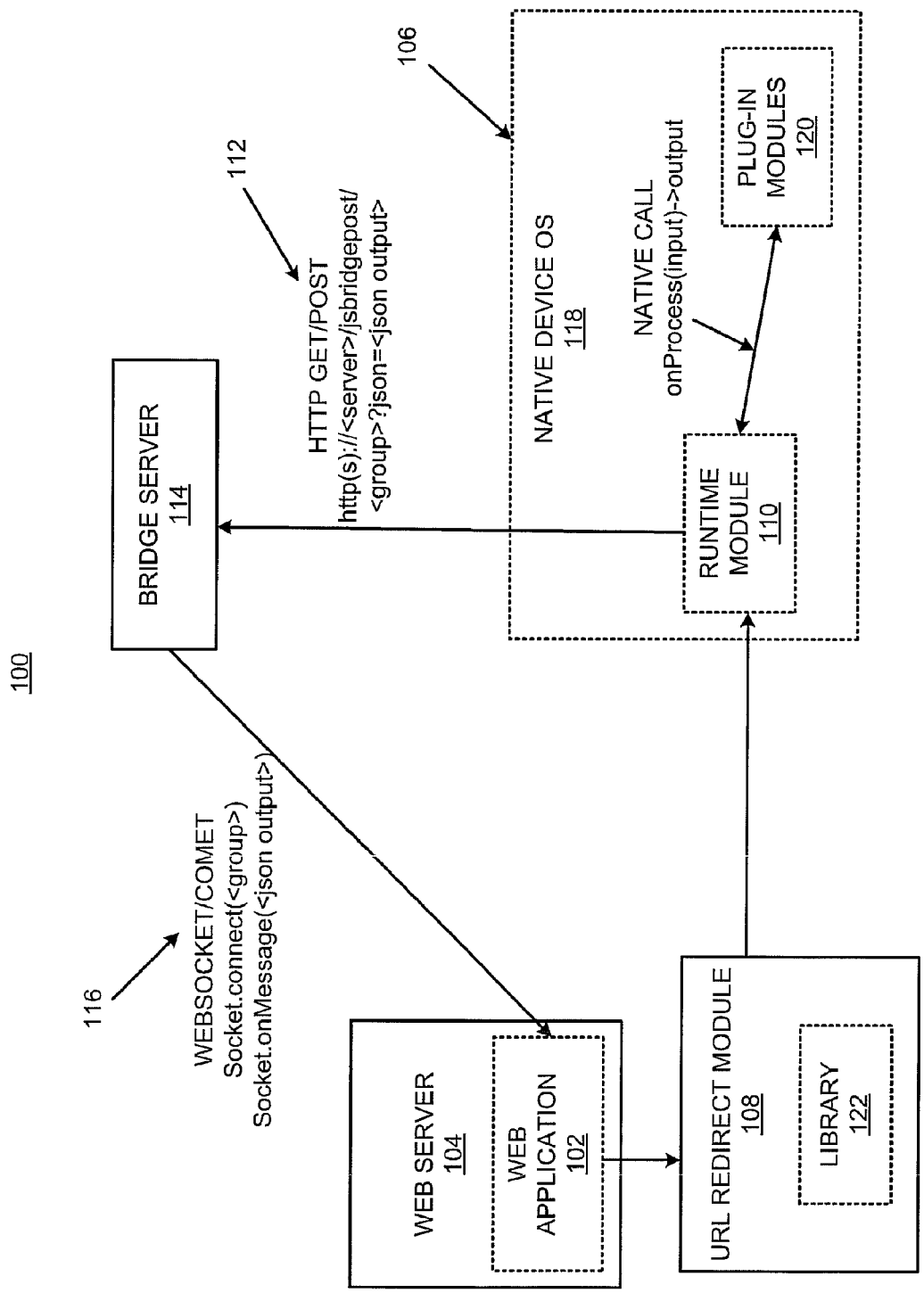
FIG. 1 illustrates an architecture of a cross-platform web-based native device feature access system, according to an example of the present disclosure.
Figure 2:
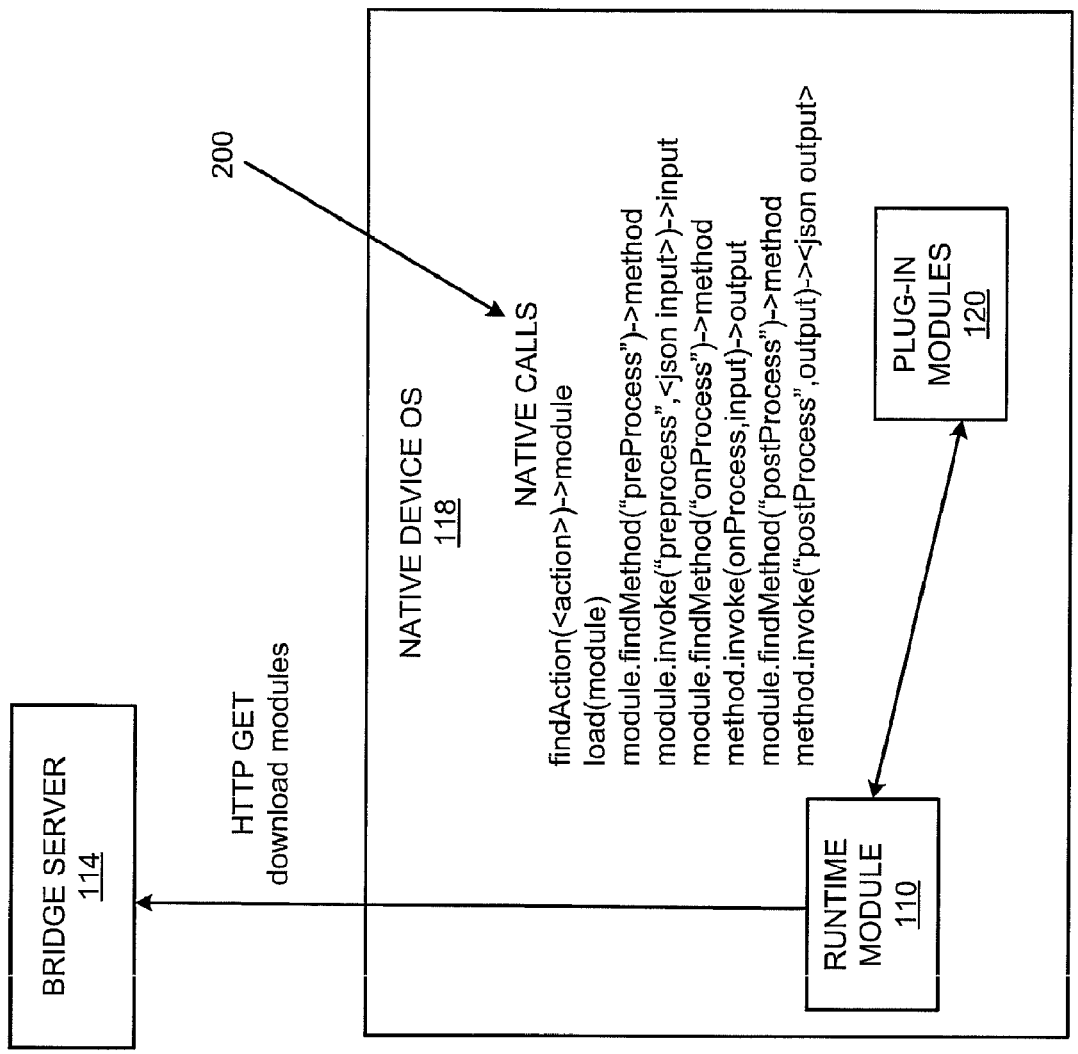
FIG. 2 illustrates an enlarged diagram of the cross-platform web-based native device feature access system of FIG. 1, illustrating dynamic loading of modules, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

A cross-platform web-based native device feature access system provides a portable API for mobile web application development for accessing low-level device features. The system may include a web application to access native device features. The web application may be a JavaScript API based web application. Calls from the web application to native code on a device may be redirected through a universal resource locator (URL) redirect module (i.e., jsbridge://) to generate a platform agnostic custom URL. The platform agnostic custom URL may operate on any platform. The redirected call may be handled by a runtime module that sends (e.g., by HTTP POST) the local results to a bridge server. The HTTP POST submits data to be processed to the bridge server. The URL redirect module may include a library to generate the custom URL. For example, the library may be a JavaScript library. The runtime module may be installed on a device, and code for the runtime module may be unique to a device platform. For example, code for the runtime module may be unique for each ANDROID, iOS, WEBOS etc., based platform.

Compared to native applications installed on a device and including native code specific to a device platform, the runtime module allows development of a single web application regardless of the device platform. The runtime module also allows the web application features to be modified and automatically implemented on a device upon execution of the web application. Thus, any updates to the web application can be automatically implemented without the need to go through any market posting and subsequent application update procedures on the device.

In order to transmit results from the bridge server to the web application, a backend asynchronous messaging bus may be built on bi-directional web communication technology. The system may support low-level native device features, such as, for example, retrieval of device information (e.g., device version, device identification (ID) and platform information), vibration, selection and upload of photos from a photo gallery, capturing and upload of photos from a device camera etc.

Once the runtime module is installed on a device, new APIs are accessible from all applications that can load arbitrary URLs and execute JavaScript. This can be accomplished, for example, by using the Webkit implementation of a platform in a native browser. By hiding the cross-platform differences behind a URL redirect implementation, the JavaScript code (i.e., the code for the JavaScript library) providing the API to web developers appears identical across all platforms. This facilitates efficient and cost-effective maintenance of the API.

The cross-platform web-based native device feature access system includes seamless deployment. For example, by updating the JavaScript API code online, the corresponding web application is also instantly updated. Based, for example, on the instant update capability, the system facilitates development of new application features. The system also provides for automated JavaScript Object Notation (JSON) to native and back serialization to facilitate development of native modules. The system further allows for third party native code component development and reuse without the need for an application store deployment at development time. Moreover, developers may interact with the system in a similar manner as a JavaScript library from their own web pages in their own domains.

2. System

FIG. 1 illustrates an architecture of a cross-platform web-based native device feature access system 100, according to an example. Referring to FIG. 1, the system 100 may include a web application 102 to access native device features. For example, the web application 102 may be a JavaScript API based web application. The web application 102 may be hosted on a web server 104. Although one web application 102 is shown, a plurality of web applications may be hosted on the web server 104. Calls from the web application 102 to native code on a device 106 may be redirected through a URL redirect module (i.e., jsbridge://) 108 to generate a platform agnostic custom URL. The URL redirect module 108 may include a library 122 to generate the custom URL. For example, the library 122 may be a JavaScript library.

The redirected calls may be received and handled by a runtime module 110. The runtime module 110 may send (i.e., by HTTP POST) at 112 local results to a bridge server 114. The use of the bridge server 114 may forego any need for a developer to have access to the web server 104. Further, the bridge server 114 may be used to implement value added features, such as, for example, store and forward messaging, hosting of shared content, mining of shared content, group (notification channel) discovery management etc. Code for the runtime module 110 may be unique to a device platform. In order to transmit results from the bridge server 114 to the web application 102, a backend asynchronous messaging bus 116 that is built on bi-directional web communication technology may be employed. For example, WebSocket technology may be employed. WebSocket is a web technology providing for bi-directional, full-duplex communications channels, over a single Transmission Control Protocol (TCP) socket. Alternatively, values from the bridge server 114 may be returned to the web application 102 by long polling or any other COMET technique.

The architecture of FIG. 1 generally allows for dynamic discovery and loading of components potentially built by third parties without the need to update a native application. The system 100 may support features, such as, for example, retrieval of device information (e.g., device version, device identification (ID) and platform information), vibration, selection and upload of photos from a photo gallery, capturing and uploading of photos from a device camera etc. As described in detail below, various plug-in modules 120 may be provided for implementing the various native features.

The modules 108, 110 and 120, and other components of the system 100 may comprise machine readable instructions stored on a computer readable medium. In addition, or alternatively, the modules 108, 110 and 120, and other components of the system 100 may comprise hardware or a combination of machine readable instructions and hardware. Further, the web application 102, runtime module 110, native device OS 118, plug-in modules 120 and library 122 are shown as dotted to indicate that they may execute on a local device, even though web application 102 and URL redirect module 108 may be deployed remotely in a web server.

The components of the system 100 are described in further detail with reference to FIGS. 1-4C.

Referring to FIG. 1, the web application 102 for accessing native device features may be hosted on the web and may thus be implemented and/or executed on a web browser of a computing device. In one example, the web application 102 is executed on a web browser of the device 106, without the need for platform specific deployment. The device 106 may comprise a web-enabled cellular telephone, a tablet computer, a personal computer, etc. All calls from the web application 102 to native code on the device 106 go through a URL redirect module (i.e., jsbridge://) 108 and are handled by the runtime module 110. The runtime module 110 is to send (i.e., by HTTP POST) at 112 local results to the bridge server 114. The library 122 of the URL redirect module 108 may be used to generate a custom URL. For example, the URL redirect module 108 of FIG. 1 may include a redirected call (i.e., a custom URL) as follows: window.location=jsbridge://hp.com/<group>?action=<action>&json=<json input>&next=window.location. In this example, the library 122 is used to generate the custom URL by taking a JavaScript object and serializing it to a JSON string that is encoded in the URL.

The URL redirect module 108 may use the library 122 to further take the action and group, and create an API around the call from the web application 102. The URL redirect module 108 may be used to launch native applications and allows for the making of a call from the web environment into the native environment of the device 106. The web application 102 may thus access the same set of resources as a native application on the device 106. For example, in order to execute the web application 102, the browser of the device 106 may be redirected using the URL redirect module 108. The native operating system (OS) 118 of the device 106 may implement the redirected URL. In addition, the redirected URL may include the action that is requested to be performed by the web application 102.

The runtime module 110 receives calls from the web application 102 and sends (i.e., by HTTP POST) at 112 local results to the bridge server 114. The runtime module 110 may include code to access functions of the native platform of the device 106. For example, the runtime module 110 may include code to launch the camera on the device 106, or other features, such as, for example, vibrate the device, etc. For example, referring to FIG. 2, native calls 200 may be placed to various plug-in modules 120 (described in further detail below) for implementing the various native features. Once the runtime module 110 is installed on the device 106, any web application 102 having proper authorization may be executed on the device 106, without an application store pre-approval process. The runtime module 110 may translate the aforementioned custom URL into native object calls. For example, for an ANDROID device, the runtime module 110 may translate JSON strings into JAVA objects, and for an iOS device, the runtime module 110 may translate JSON strings into Objective-C objects.

Referring to FIGS. 3A and 3B, an example of code 300 for the runtime module 110 for an ANDROID device, and an example code 350 for the runtime module 110 for an iOS device are shown.

Referring first to FIG. 3A, for the example of code 300 for the runtime module 110 for an ANDROID device, at 302, the custom URL parameter action is retrieved. At 304, the custom URL parameter JSON with request input is retrieved. At 306, loading of a class into Java Virtual Machine (JVM) is shown. At 308, lookup of the onProcess method to call is shown. At 310, invocation of the onProcess method and conversion from JSON to Java input is shown. At 312, conversion of Java output to JSON string is shown. At 314, the response is sent to the bridge server 114.

Referring to FIG. 3B, for the example of code 350 for the runtime module 110 for an iOS device, at 352, the runtime module 110 is called by the OS when a custom URL is invoked from the browser. At 354, extraction of the query part of the custom URL is shown. At 356, extraction of the action parameter is shown. At 358, extraction of the JSON parameter with the request input is shown. At 360, allocation of the JSON parser is shown. At 362, parsing input to NSDictionary is shown. At 364, the output dictionary is shown. At 366, the runtime module 110 checks if action matches the method to be called. At 368, calling the detected plug-in module 120 is shown. At 370, the runtime module 110 sends a response to the bridge server 114.

Referring to FIG. 1, the various plug-in modules 120 for implementing the various native device features may be provided, for example, for vibrating the device 106, selecting and uploading photos from a photo gallery, capturing and uploading of photos from a device camera, providing device identification and platform information etc. For example, referring to FIG. 4A, code 400 for a JavaScript call for the library 122 into a vibration module is illustrated. The code 400 may be identical across different device platforms. FIGS. 4B and 4C respectively illustrate code 440, 460 for specific applications. For example, code 440 illustrates code for an ANDROID vibrate module implementation, and code 460 illustrates code for an iOS vibrate module implementation. The ANDROID vibrate module implementation of FIG. 4B may be provided with a runtime module 110 implemented on an ANDROID platform device and the iOS vibrate module implementation may be provided with a runtime module 110 implemented on an iOS platform device.

Figure 4A:
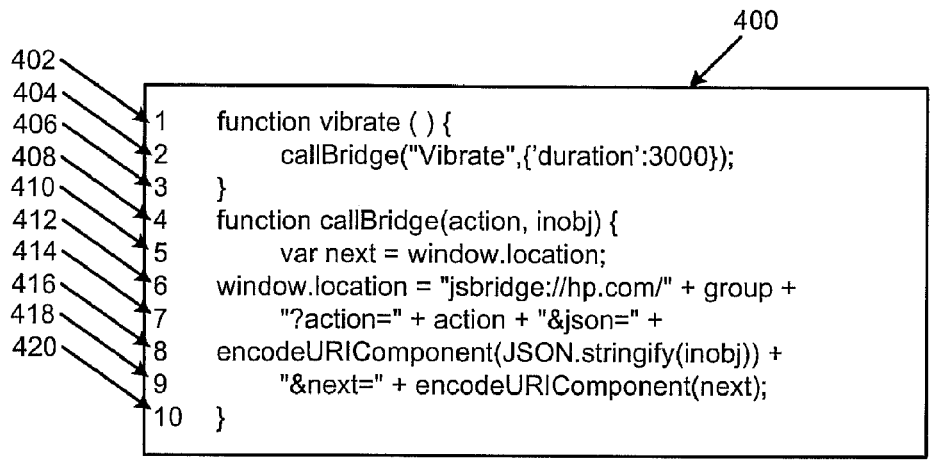
FIGS. 4A-4C respectively illustrate an example of a JavaScript call into a vibration module, an example of an ANDROID vibrate module implementation, and an example of an iOS vibrate module implementation, according to an example of the present disclosure.
Figure 4B:
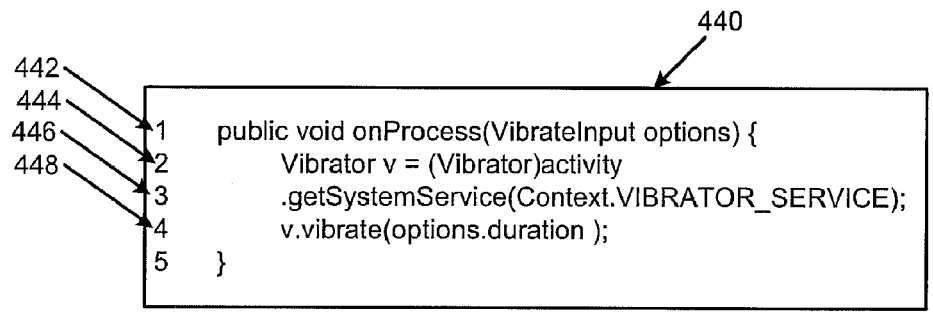
Figure 4C:
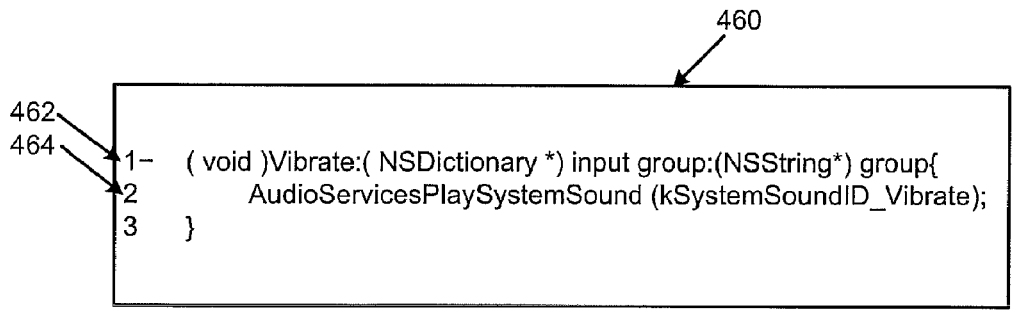

Referring to FIG. 4A, the code 400 for a JavaScript call for the library 122 into a vibration module is shown. At 402, the JavaScript method called by the web application to make the device vibrate is shown. At 404, a helper method to make an arbitrary call into the bridge (i.e., runtime module 110) is shown. At 408-418, the code to construct the custom URL which ultimately launches and calls into the runtime module 110 is shown. At 416, JavaScript conversion of the input from JSON representation into a URL compatible parameter string is shown.

Referring to FIG. 4B, the code 440 for the ANDROID vibrate module implementation is shown. At 442, a method called onProcess( ) may be implemented in a class matching the action name of the request. The input is a Java object matching the JSON options for the web application. At 444-448, ANDROID code to make a device vibrate is shown.

Referring to FIG. 4C, the code 460 for the iOS vibrate module implementation is shown. At 462, the name of the iOS method matches the name of the action in the request and the request input is available in a NSDictionary object. At 464, iOS code to make a device vibrate is shown.

3. Method

Figure 5:
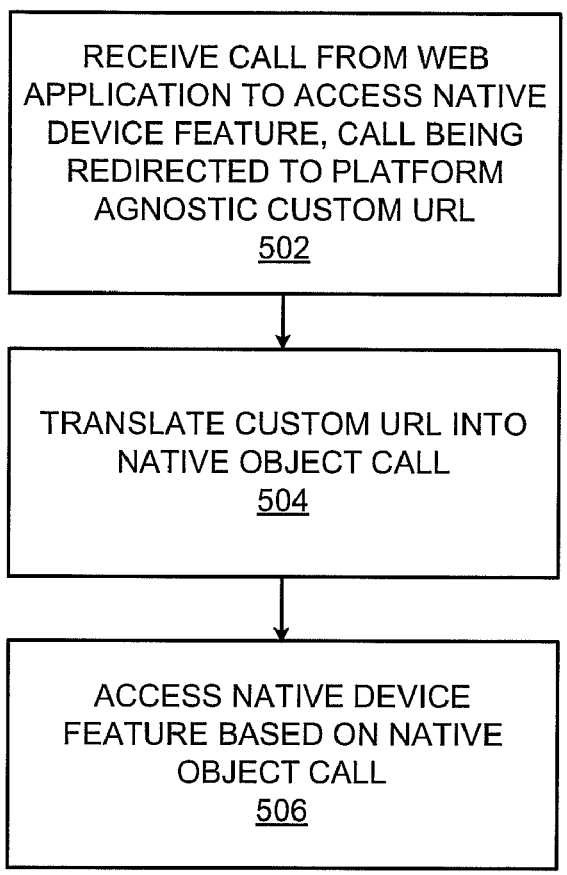
FIG. 5 illustrates a method for cross-platform web-based native device feature access, according to an example of the present disclosure.

FIG. 5 illustrates a flowchart of a method 500 for cross-platform web-based native device feature access, according to an example. The method 500 may be implemented on the cross-platform web-based native device feature access system described above with reference to FIGS. 1-4C by way of example and not limitation. The method 500 may be practiced in other systems.

Referring to FIG. 5, at block 502, the method may include receiving a call from a web application to access a native device feature, with the call being redirected to a platform agnostic custom URL. For example, referring to FIG. 1, the system 100 may include the web application 102 to access native device features. The web application 102 may be hosted on the web server 104, and calls from the web application 102 to native code on the device 106 may be received by the URL redirect module 108. Calls from the web application 102 to native code on the device 106 may be redirected through the URL redirect module (i.e., jsbridge://) 108 to generate a custom URL. The URL redirect module 108 may access the library 122 to generate the custom URL. The redirected call may be received by the runtime module 110.

At block 504, the method may include translating the custom URL into a native object call. For example, referring to FIG. 1, the runtime module 110 may translate the aforementioned custom URL into native object calls. For example, for an ANDROID device, the runtime module 110 may translate JSON strings into JAVA objects, and for an iOS device, the runtime module 110 may translate JSON strings into Objective-C objects.

At block 506, the method may include accessing the native device feature based on the native object call. For example, referring to FIG. 1, the runtime module 110 may include code to access functions of the native platform of the device 106. For example, the runtime module 110 may include code to launch the camera on the device 106, or other features, such as, for example, vibrate the device etc. For example, referring to FIG. 2, native calls 200 may be placed to various plug-in modules 120 for implementing the various native features.

4. Computer Readable Medium

Figure 6:
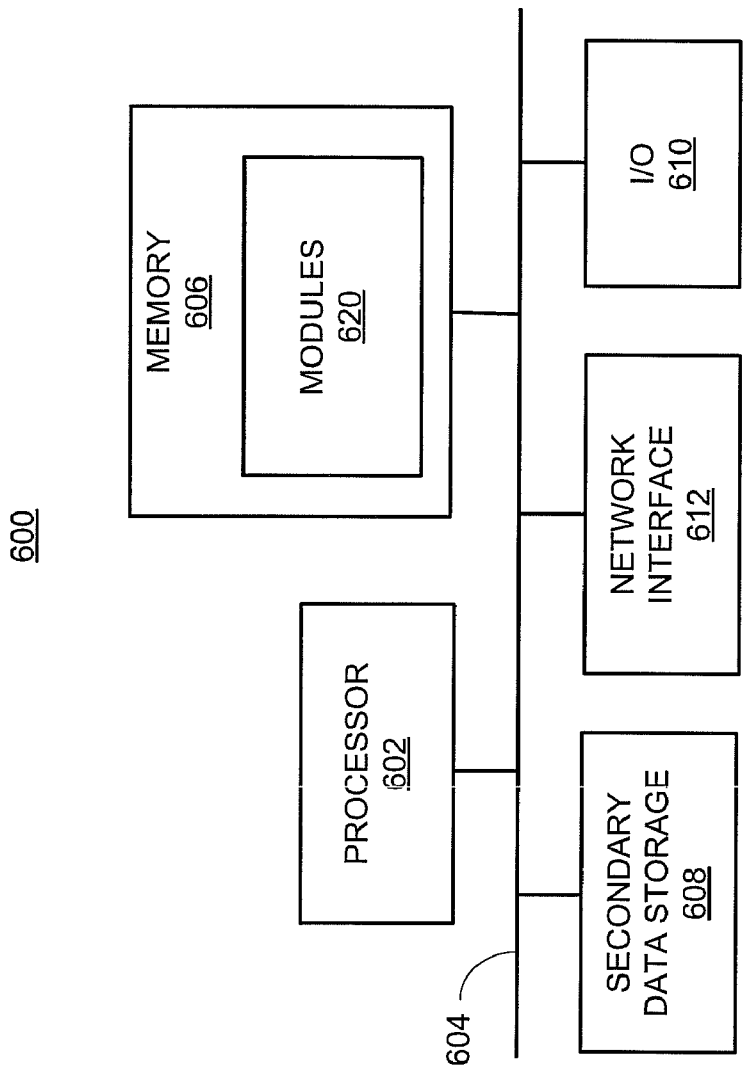
FIG. 6 illustrates a computer system, according to an example of the present disclosure.

FIG. 6 shows a computer system 600 that may be used with the examples described herein. The computer system 600 represents a generic platform that includes components that may be in a server or another computer system. The computer system 600 may be used as a platform for the system 100. The computer system 600 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes a processor 602 that may implement or execute machine readable instructions performing some or all of the methods, functions and other processes described herein. Commands and data from the processor 602 are communicated over a communication bus 604. The computer system 600 also includes a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include modules 620 including machine readable instructions residing in the memory 606 during runtime and executed by the processor 602. The modules 620 may include the modules 108, 110 and 120 of the system 100 shown in FIG. 1.

The computer system 600 may include an I/O device 610, such as a keyboard, a mouse, a display, etc. The computer system 600 may include a network interface 612 for connecting to a network. Other known electronic components may be added or substituted in the computer system 600.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for cross-platform web-based native device feature access, the method comprising:
    receiving a call from a web application to access a native device feature, the call being redirected to a platform agnostic custom uniform resource locator (URL), wherein programming instructions, including code for the web application and code for a library for redirecting the call to the custom URL, are identical across different device platforms, and the library is used to generate the custom URL by serializing a JavaScript object to a JavaScript Object Notation (JSON) string that is encoded in the custom URL;

translating the custom URL into a native object call; and accessing, by a processor, the native device feature based on the native object call.

2. The method of claim 1, further comprising:

sending results from the accessing of the native device feature to a bridge server to provide a platform independent format of communicating back to the web application; and forwarding the results from the bridge server to the web application.

3. The method of claim 2, further comprising:

forwarding the results from the bridge server to the web application via a messaging bus built on bi-directional web communication technology.

4. The method of claim 1, wherein the native device feature includes one of retrieval of device information, vibration of a device, selection of a photo from a photo gallery, uploading of a photo from the photo gallery, capturing of a photo from a device camera, and uploading of a photo from the device camera.

5. The method of claim 1, further comprising:

including an action to be performed by the web application in the custom URL.

6. The method of claim 5, wherein the action includes execution of the native device feature.

7. The method of claim 1, wherein the web application includes a JavaScript based application programming interface (API), the method further comprising:

updating JavaScript API code online to update the web application.

8. The method of claim 1, wherein the library is a JavaScript library.

9. The method of claim 1, further comprising:

accessing code to translate the custom URL into the native object call; and accessing the native device feature by accessing code to execute the native device feature, wherein the code to translate the custom URL and the code to execute the native device feature is specific to a device platform.

10. The method of claim 1, further comprising:

updating the web application to automatically implement the update on a plurality of devices including the different device platforms.

11. The method of claim 1, further comprising:

permitting any web application that has proper authorization to be executed on a device including the native device feature, without an application store pre-approval process.

12. A system for web-based native device feature access, the system comprising:

a memory storing a module comprising machine readable instructions to:

receive a call from a web application to access a native device feature;

access code for a library to redirect the call to a platform agnostic custom uniform resource locator (URL), wherein programming instructions, including code for the web application and the code for the library, are identical across different device platforms, and the library is used to generate the custom URL by serializing a JavaScript object to a JavaScript Object Notation (JSON) string that is encoded in the custom URL;

access code to translate the custom URL into a native object call, the code to translate being specific to a device platform; and access code to execute the native device feature based on the native object call, the code to execute being specific to the device platform; and a processor to implement the module.

13. The system of claim 12, wherein the native device feature includes one of retrieval of device information, vibration of a device, selection of a photo from a photo gallery, uploading of a photo from the photo gallery, capturing of a photo from a device camera, and uploading of a photo from the device camera.

14. The system of claim 12, wherein the custom URL includes an action to be performed by the web application.

15. A non-transitory computer readable medium having stored thereon a computer executable program for web-based native device feature access, the computer executable program when executed causes a computer system to:

receive a call from a web application to access a native device feature;

redirect the call to a platform agnostic custom uniform resource locator (URL), wherein programming instructions, including code for the web application and code for a library for redirecting the call to the custom URL, are identical across different device platforms, and the library is used to generate the custom URL by serializing a JavaScript object to a JavaScript Object Notation (JSON) string that is encoded in the custom URL;

translate, by a processor, the custom URL into a native object call; and access code to execute the native device feature based on the native object call, the code to execute being specific to a device platform.

* * * * *